Aug. 20, 1935.  W. A. ROSENBERGER  2,011,984
SURFACING APPARATUS
Filed April 5, 1934    4 Sheets-Sheet 1

Inventor
William A. Rosenberger

By Strauch & Hoffman
Attorneys

Aug. 20, 1935.   W. A. ROSENBERGER   2,011,984
SURFACING APPARATUS
Filed April 5, 1934   4 Sheets-Sheet 2

Inventor
William A. Rosenberger

Strauch & Hoffman
Attorneys

Aug. 20, 1935.  W. A. ROSENBERGER  2,011,984
SURFACING APPARATUS
Filed April 5, 1934  4 Sheets-Sheet 3
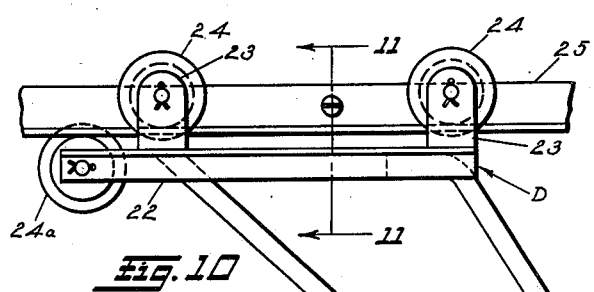
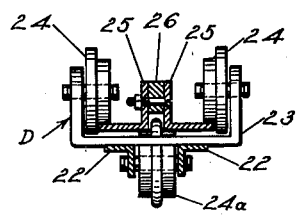
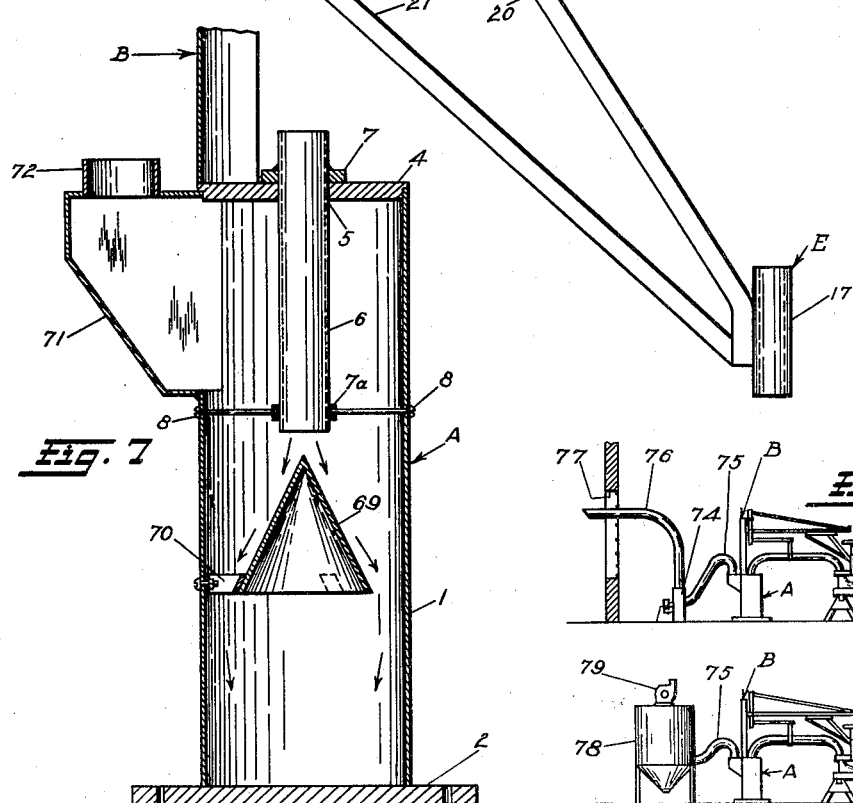
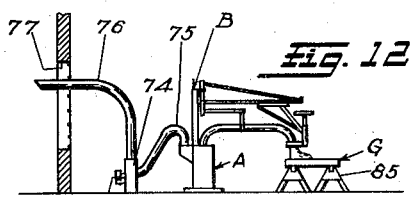
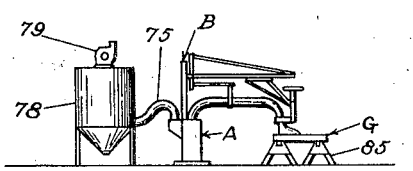
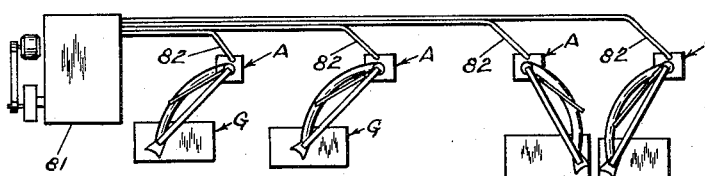
Inventor
William A. Rosenberger
By Strauch & Hoffman
Attorneys Aug. 20, 1935.  W. A. ROSENBERGER  2,011,984
SURFACING APPARATUS
Filed April 5, 1934  4 Sheets-Sheet 4
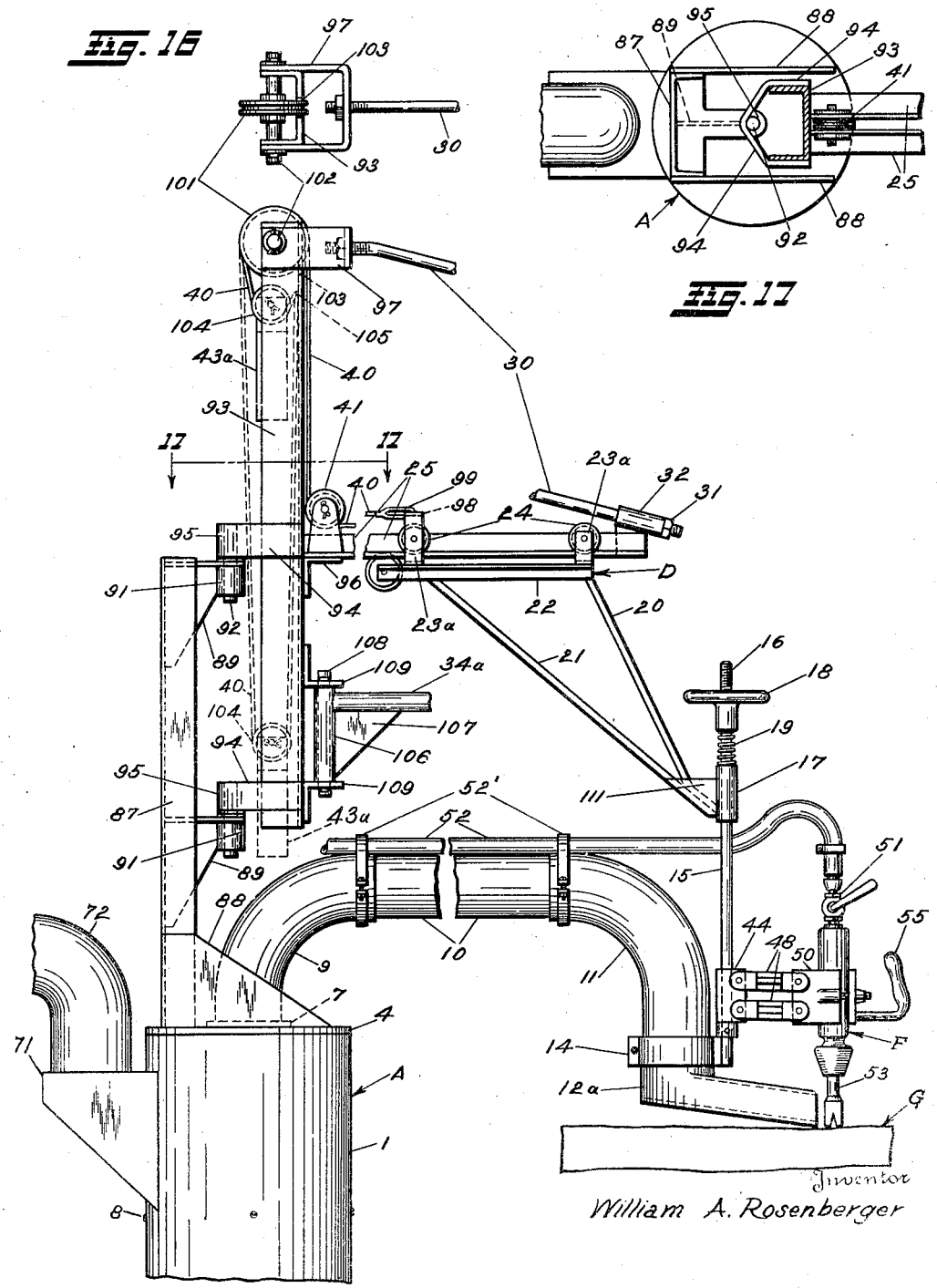
Inventor
William A. Rosenberger
By Strauch & Hoffman
Attorneys Patented Aug. 20, 1935

2,011,984

UNITED STATES PATENT OFFICE 2,011,984

SURFACING APPARATUS

William A. Rosenberger, Hagerstown, Md., assignor to Pangborn Corporation, a corporation of Maryland Application April 5, 1934, Serial No. 719,183

15 Claims. (Cl. 125—8)

This invention relates to surfacing apparatus and is particularly concerned with apparatus for collecting and disposing of dust or other material that is freed during surfacing or other stone working operations.

More particularly, the present invention relates to apparatus employed in the stone and monumental art and is adapted to collect dust from bankers and stone surfacing machines. The apparatus of the present invention as a matter of fact really constitutes a self-contained surfacing machine.

In the constructions shown in the prior art, a dust collecting nozzle is provided which may be placed in various positions with respect to the stone to be treated, while the operator holds the tool with his hands, working that section or area of the stone which is immediately in front of the dust collecting nozzle. In such prior apparatus, it is accordingly necessary to change the location of the nozzle progressingly as it becomes necessary to treat other portions of the stone surface. A further disadvantage that is inherent with such prior apparatus is that the nozzle is connected by means of a flexible suction hose to a chip or dust trap and to a fan or other blast producing means, and devices are also provided for supporting the hose and for more or less balancing the weight of the hose and the nozzles and, as means must be provided for holding both of them in a predetermined position, provision must accordingly be made by the user for supporting the chip trap and other parts of the apparatus, and, since the shops into which this apparatus usually goes are generally more or less dilapidated buildings, they require a special layout to be made to adapt the apparatus to local conditions in each case.

Another major disadvantage inherent in such prior constructions resides in the fact that, while the operator is supposed to use his tool only in front of the dust collecting nozzle, it has been found that, as the apparatus is so cumbersome to adjust for a new position, the operator often ignores the instructions concerning proper use of the apparatus and treats a very large area of stone without moving the nozzle, with the result that the device obviously does not, and cannot be expected to meet its intended purpose of efficiently collecting harmful dust under such conditions of use.

It is accordingly a primary object of my invention to devise a self-contained stone treating and dust removing unit.

It is another major object of my invention to devise means for collecting the dust from chipping tools such as are used in bankers and surfacers, and to so relate the suction nozzle to the tool that the nozzle always moves with or follows the tool over the surface of the stone as the surfacing operation proceeds, so that the operator is at all times fully protected against harmful dust.

It is another important object of the present invention to devise a stone treating apparatus that relieves the operator of the strain of holding the tool.

It is another object of this invention to provide an entirely self-contained stone treating and dust collecting unit, which is so constructed that it is not necessary to carry out alterations in existing building structures, but which may be installed in locations having very low head room without making any alterations or additions to the building structure whatsoever.

It is another object of my invention to devise a novel unitary tool holding and dust collecting nozzle assembly that may be moved as a unit over the face of the stone or other work that is being handled.

A still further object of my invention is to devise a means for holding a stone treating or like tool which may be moved horizontally over the face of the stone and which has means associated therewith for guiding it for vertical movement.

My invention further aims to provide a dust collecting nozzle with a movable tool supporting device which may undergo limited movement with respect thereto, the range of movement being limited to the efficient dust removing range of the nozzle.

Further objects will become apparent as the specification proceeds in connection with the annexed drawings, and from the appended claims.

In the drawings,

Figure 7 is a sectional view through the abrasive trap shown in Figures 1 and 2 and is taken on line 7—7 of Figure 2;

Figure 10 is an enlarged elevational view of the carriage shown in Figure 1;

Figure 11 is a sectional view taken substantially on the line 11—11 of Figure 10;

Figure 12 is an elevational view of my apparatus as it appears when associated with an individual dust exhausting unit;

Figure 13 is a view similar to Figure 12 and shows a dust collecting installation associated with my apparatus; and Figure 14 is a plan view of a series of the stone treating devices shown in Figure 1 as being connected to a common dust collecting unit.

Figure 15 is a view similar to Figure 1, but illustrates a modified form of surfacing apparatus also forming part of my invention.

Figure 16 is a fragmental top plan view of the device illustrated in Figure 15, and Figure 17 is a fragmental sectional view of the device illustrated in Figure 15, and is taken substantially along the line 17—17 of that figure, looking in the direction of the arrows.

Figure 2:
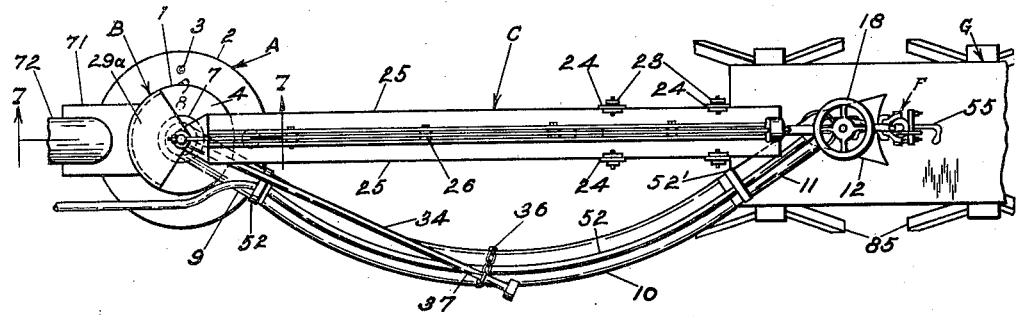
Figure 2 is a plan view of the apparatus shown in Figure 1.

Referring to the drawings, in which the same reference characters are used to indicate like parts throughout the several views, the invention consists essentially of a dust collecting unit designated generally as A, having a support or standard B supported thereon. Pivotally mounted on standard B is a crane assembly C which is adapted to swing horizontally and supported thereon for movement toward and away from standard B is a carriage D, which carries a tool and nozzle assembly supporting element E. Supporting member E is accordingly mounted for swinging movement in a horizontal plane about standard B as an axis, and it is also adapted to undergo movement toward and away from standard B, with the result that tool F and the dust collecting nozzle carried by member E may be freely moved over the entire surface of the work G. The tool holder is mounted for only a limited range of movement with respect to the dust collecting nozzle, with the result that it is impossible for the worker to use the apparatus in a manner to impair its dust collecting efficiency.

Figure 1:
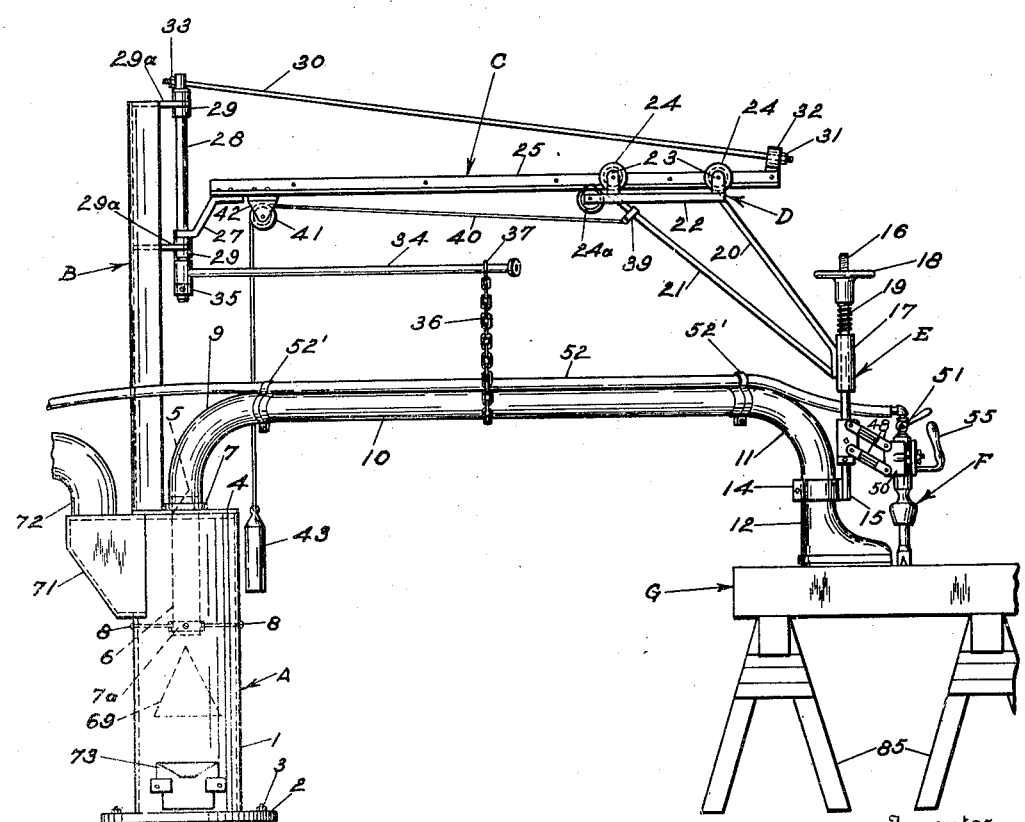
Figure 1 is a side elevational view of my novel stone working apparatus, illustrating it in working position with a stone associated therewith.

Referring more particularly to Figures 1 and 7, collector A comprises a container 1 secured to a base plate 2 which may be bolted to the floor by means of bolts 3. Container 1 serves the double purpose of supporting the whole apparatus as well as constitutes an abrasive or chip trap, and its structure will be more fully described hereinafter.

Container 1 is provided with a top 4 having a circular opening 5 into which a pipe 6 projects. Pipe 6 is provided with a flange 7 which loosely rests upon top 4 of container 1. The lower end of pipe 6 projects into a guide ring 7a which is preferably disposed centrally in container 1 and is secured to the walls thereof by means of spacer rods or bolts 8. The upper end of pipe 6 projects a little distance above flange 7 and an elbow 9 is secured thereto.

A flexible suction hose 10 is secured at one end to elbow 9 and terminates at its other end in an elbow 11 which is preferably swivelly, but which may be rigidly mounted in a suction nozzle 12. Elbow 9 and hose 10 are accordingly mounted for rotation about a vertical axis and the greater part of their weight is supported by flange 7, which functions as a thrust bearing, and, at the same time, maintains an air tight seal between elbow 9 and the interior of container 1.

Figure 6:
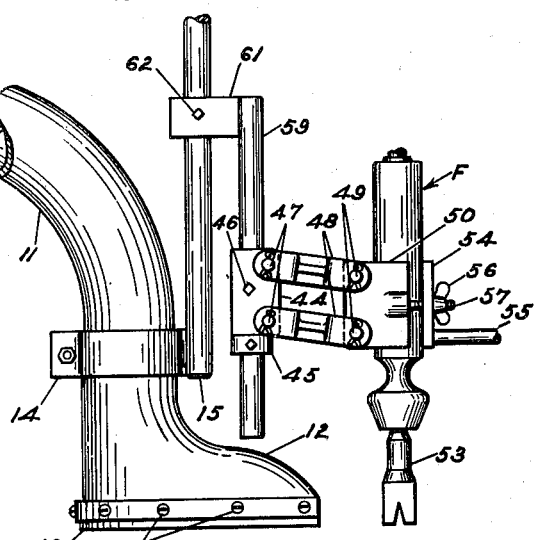
Figure 6 is a view similar to Figure 3, but illustrates a modified form of tool holder as being associated with the nozzle assembly.

With reference to Figure 6, suction nozzle 12 takes the form of a hood having an open bottom. The lower edge of nozzle 12 is preferably provided with a rubber member 13 which is secured thereto by means of a binding strip 13a and nut and bolt assemblies 13b. Rubber member 13 is adapted to lightly rest upon the surface of the work and maintain a substantially air tight seal so as to insure proper suction conditions at the mouth of the nozzle.

Suction nozzle 12 is supported by means of a clamp member 14, to which is welded or otherwise suitably secured a vertical shaft 15. Shaft 15 is provided at its upper end with threads 16, and it extends through and is loosely guided for vertical movement in a sleeve member 17, which is welded or otherwise secured to the supporting members of carriage D as will be hereinafter pointed out. A hand wheel 18 is associated with the upper end of shaft 15 and a compression spring 19 may be disposed between the upper side of sleeve 17 and hand wheel 18, and is preferably of sufficient strength to counter-balance the weight of nozzle assembly and the tool that will be hereinafter described. By rotating hand wheel 18 in the proper direction, nozzle 12 may be raised or lowered with respect to work G.

Sleeve 17 is secured to downwardly extending members 20 and 21 of carriage D by means of a welding or like operation, but it may if desired be bolted thereto. Members 20 and 21 extend upwardly and are disposed between and are welded to the vertical flanges of a pair of angle members 22. Secured to the horizontal flanges of angles 22 are a pair of U-shaped supports 23 in which a plurality, preferably four, of wheels 24 are journaled. Wheels 24 are adapted to ride upon the horizontal flanges of a pair of angle members 25 which are secured together by nut and bolt assemblies and are maintained in spaced relation by means of blocks 26 disposed between the vertical flanges thereof. Carriage D is prevented from rocking in a vertical plane by means of a guide wheel 24a which is journaled in the vertical flanges of angle members 22 and cooperates with the lower sides of angle members 25.

Carriage D is accordingly mounted for movement toward and away from standard B, and members 25 are supported for swinging movement in a horizontal plane in the following manner. Secured to the rear end of members 25 is a common bracket 27 which is journaled upon a vertical shaft 28. Shaft 28 is in turn journaled in a pair of vertically spaced bearings 29, which are supported in plate members 29a, and the latter are welded or otherwise suitably secured to support B which, as seen in Figure 2, is of arcuate configuration. Bearings 29 are preferably disposed in vertical alignment with aperture 5 located in container 1, in order that the elbow 9 and members 25 may rock about a common axis. A tie rod 30 extends through the upper end of shaft 28 and is adjustably secured to the outer end of members 25 by means of a nut 31 and a bracket 32. A nut 33 is threaded onto the other end of rod 30. It is apparent that members 25 and 30 constitute a crane structure that is freely rockable about the axis of shaft 28. When the device is initially set up, nut 31 may be manipulated to establish parallelism of members 25 with the floor of the building in which the apparatus is located, and it may also be employed to re-establish proper conditions after the device is in use, should the occasion for so doing arise.

Shaft 28 extends downwardly beyond lower bearing 29 and pivotally supports a supplemental crane member or arm 34 which is restrained from downward displacement from shaft 28 by means of a collar 35 which is set screwed or otherwise fastened thereto. Rod 34 supports a chain 36, by means of a ring 37. Chain 36 hangs in a loop and is disposed around flexible tube 10, and is adapted to support the mid portion of the latter in a substantially horizontal plane irrespective of the position that may be attained by nozzle 12. This is illustrated in Figure 2 wherein it is observed that the flexible hose is permitted to be flexed sideways but is held in a substantially horizontal plane by means of chain 36. In view of the fact that elbows 9 and 11 are swiveled freely in casing 1 and nozzle 12 respectively, it is apparent that nozzle 12, which is rigidly held by clamp 14, may swivel about the axis of shaft 15 independently of any configuration which flexible hose 10 may assume. Although I prefer to use the structure just described for supporting the mid portion of hose 10, it may, if desired, be omitted if the hosing is self-sustaining, or any other suitable means may be employed for this purpose without departing from the spirit of my invention.

Flexible hose 10 may be of any desired character, but as most hoses of which I am aware have an inherent tendency to straighten out, I preferably provide the apparatus with means for counter-balancing this tendency as it would otherwise tend to push carriage D away from support B. I accordingly secure to member 21 of carriage D, by means of a clip 39, a cord 40, which passes over a pulley 41 supported in a bracket 42 carried by members 25. A counterweight 43 is secured to cord 40, and by properly calculating the weight thereof so as to properly balance the straightening tendencies of flexible hose 10, carriage D moves very easily on crane C while the whole crane swivels on shaft 28. Although I prefer to use a counterweight for opposing the internal stresses in hose 10, a spring, associated with arm 34 or hose 10, may be used for this purpose without departing from the spirit of my invention.

I have accordingly disclosed a dust collecting nozzle organization that may be freely moved in the horizontal plane over the entire working surface of work G, and although any known type of working tool may be supported on shaft 15 in any suitable manner, I preferably mount the tool for vertical movement with respect to the suction nozzle, the tool in this instance being illustrated as a stone working tool of the reciprocating type.

Figure 4:
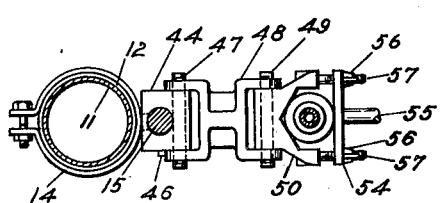
Figure 4 is a sectional view taken substantially on the line 4—4 of Figure 3, looking in the direction of the arrows.
Figure 5:
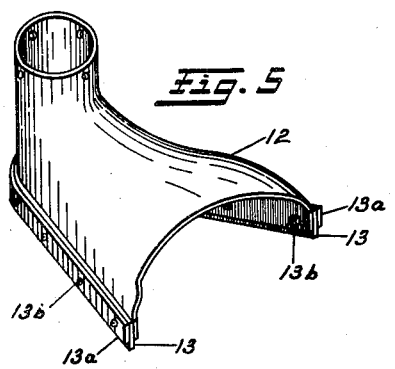
Figure 5 is a perspective view of the nozzle employed in the device shown in Figure 1.
Figure 3:
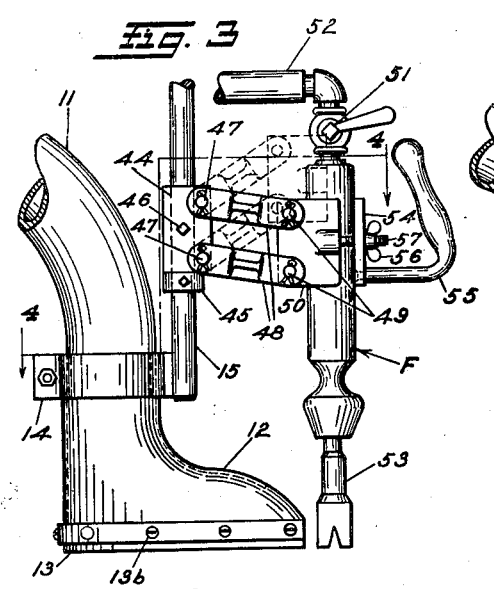
Figure 3 is an enlarged elevational view of the nozzle and tool holding support of the apparatus shown in Figure 1.

With particular reference to Figures 3 and 4, a block 44 loosely fits shaft 15 and is adapted to be restrained against downward movement thereon by means of a collar 45 which is set screwed or otherwise secured to shaft 15. Block 44 is also provided with a set screw 46 which may be taken up to restrain block 44 against vertical and angular movement with respect to shaft 15. Block 44 is provided with two vertically spaced parallel pins 47, upon which a pair of links 48 are journaled. Supported upon the other end of links 48, by means of pins 49, is a block member 50. Block 50 is accordingly mounted for vertical movement and is restrained against tilting out of a vertical position by links 48 and it is provided with an angular or V-shaped groove in which a tool F, having a shut-off valve 51, supply hose 52 and a bit 53, is supported. Air supply hose 52 is preferably secured to hose 10, by means of clamps 52' or the like, in order that it may readily follow the nozzle and tool assembly over the work. Tool F is adapted to be detachably secured to block 50 by means of a plate 54 having a handle 55 secured thereto. Plate 54 is adapted to be secured to block 50 by means of wing nuts 56 which are threaded on studs 57 carried by block 50.

It is accordingly apparent that parallel links 48 permit raising and lowering of the tool holder, as indicated by the dotted lines shown in Figure 3, in such fashion that the center line of the tool is always on a line parallel to the center line of shaft 15, with the result that bit 53 will always be held in a vertical position against the work. The bit may be easily and quickly changed without moving tool F by simply grasping handle 55 and lifting the tool so that the bit may be pulled out of its socket and a new bit inserted. Although I find it satisfactory to allow the tool to rest by gravity upon the work, it is to be understood that, if desired, a spring or counterweight mechanism may be associated with block 50 or links 48 for partially or completely counterbalancing the weight of the tool.

Handle 55 is employed to guide the tool over the surface of the work, and it may also be employed to exert pressure upon bit 53, and lower the tool and nozzle assembly downwardly as the work proceeds. It is evident that tool F and suction nozzle 12 will move together at all times at the will of the operator who can push the nozzle away from him or pull it toward him, and he can shift it to the left or right over the whole surface of the stone. In any position the parts may assume with respect to the work, tool F will always be in front of the suction nozzle, with the result that the material removed from the stone during the working operation is efficiently removed from the atmosphere.

When set screw 46 is loosened, block 44 can swivel independently a certain distance around shaft 15 so that the tool may be played substantially across the whole width of the nozzle, but the range of movement is preferably limited so that it is impossible for the operator to move the tool so far away from the nozzle that the dust removing capabilities thereof will be impaired. The tool holding organization is especially advantageous for holding the reciprocating tool of the character disclosed for the reason that the vibrations and shocks set up in the tool and block 50 merely result in a vertical vibratory deflection of parallel links 48, with the result that vibratory shocks are not imposed upon shaft 15 nor any of the associated members.

It is sometimes desirable to support air tool F lower than it is shown in Figure 4, and I have accordingly illustrated a modified form of my invention in Figure 6 that is especially adapted for this purpose. With continued reference to Figure 6, block 44 and collar 45 are supported on an auxiliary shaft 59, which is secured to shaft 15 by means of a bracket 61 and a set screw 62. In view of the fact that the tool may be manipulated in this form of the invention in the same manner as that described in connection with the first form of my apparatus, its operation will not be again described.

Figure 8:
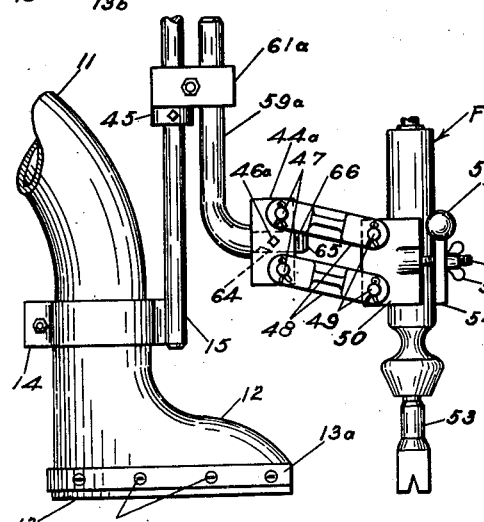
Figure 8 is a view similar to Figure 3, but illustrates a modified form of tool holder that makes it possible to swivel the tool about a horizontal axis.
Figure 9:
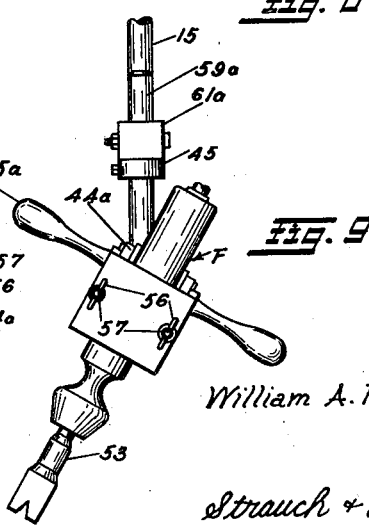
Figure 9 is a view illustrating the device shown in Figure 8 as it appears when viewed from the right hand side thereof, and when the tool has been rocked about its support for working concave surfaces.

In Figures 8 and 9, I have illustrated a further modified form of tool support and, in this form of the invention, the tool holder is mounted for rocking movement in a vertical plane in order to allow concave or convex surfaces to be produced by the tool, and, to this end, block 44a is provided with a horizontally extending bore 64 and is journaled upon the horizontal portion 65 of shaft 59a. Block 44a may be restrained against removal from member 65 by means of a cotter pin 66 or the like. A modified clamping element 61a is employed to secure shaft 59a to shaft 15, which allows shaft 59a to swivel about shaft 15. In this form of the invention, the tool clamping element is preferably replaced by a plate 54a having a pair of horizontally extending handles 55a secured thereto, in order that the tool may be guided with greater comfort when working on concave or convex surfaces. If it is desired, however, set screw 46a may be tightened up to lock block 44a to member 65 in a vertical or angular position and under such conditions the tool may be operated in the manner described in connection with the apparatus shown in Figures 3 and 6. It is adapted to swing in a horizontal plane about shaft 15 as an axis.

Although any suitable form of abrasive trap may be employed in my invention and good results obtained, I preferably employ the structure shown and it has given very good results in practice, and it will now be described. With particular reference to Figure 7, an inverted cone 69 is secured in place in container 1 in spaced relation to the walls thereof by means of spacer rods 70. Chips which enter the container downwardly through pipe 6 in the direction of the arrow are thrown against the point of cone 69 and the inrushing air will sweep them downward through the annular space between the lower edge of the cone and the inner walls of container 1. The chips will lodge in the bottom of the container whereas the air will reverse, escaping upwardly through a hood 71 and a pipe connection 72 to the fan or dust collector that is used with the apparatus. Container 1 is provided with a removable closure 73, through which the chips and other foreign matter that may accumulate in the container may be removed from time to time.

It will be observed that the whole apparatus is self contained and is independent of any building structure. It may be set up as a single unit or they may be connected in banks, and, although I have shown the apparatus as being rigidly secured to the floor of the building, it may be mounted on a frame which merely rests by gravity on the surface of the floor, or, if it is desired to provide greater portability of the unit, casters or rollers may be associated with the frame so that the entire unit may be moved from place to place in the building in which it is used.

The apparatus may be set up as a single unit as illustrated in Figure 12 by simply connecting abrasive trap A to a fan 74 by means of a conduit 75 which exhausts the dust laden air through a pipe 76 through a window 77, or any other suitable opening in the building into the atmosphere.

On the other hand, pipe 75 may be discharged into a dust collector, which retains all the fine dust, and an arrangement of this character is illustrated in Figure 13. With further reference to Figure 13, conduit 75 leads directly into a dust collector noted generally at 78, having a fan and motor assembly 79 associated therewith.

It is also possible to connect a whole battery of my novel units to a single dust collector and fan, as shown in Figure 14. In this case, however, it has been found to be impracticable to shut off the ventilation from any one unit, as otherwise air velocity in the main pipe would drop to a point where it would not be able to carry the heavy dust over to the collector which would cause the dust pipes to clog up. For complete flexibility and maximum power saving, it is accordingly desirable to connect each unit to a common dust collector by means of individual pipes so that any one of the units may be shut off without affecting the air velocity in the pipes leading to the other unit, and this arrangement is shown in 14 where each abrasive trap A is connected to a dust collector 81 by means of an individual pipe 82. Any unit may accordingly be selectively put out of commission by closing a valve located in the pipe 82 (not shown).

The operation of the units are the same, irrespective of the particular exhaust arrangement employed therewith, and the operation of one of the units will now be described.

The apparatus is set up in the building in which it is to be used and it is either bolted to the floor as previously described or it is supported by any suitable type of framework. Nut 31 is then adjusted to cause members 25 to swing in a substantially horizontal plane, and the apparatus is then connected to the exhausting fan, and it is now ready for use. The article that is to be surfaced or otherwise operated upon is then supported upon horses 85 or any other suitable support, the article in this instance being a stone monument. Hand wheel 18 is then rotated to bring the nozzle into close proximity to, or into, light engagement with the surface of the stone. Valve 51 is opened, and handle 55 (or handles 55a) is then grasped and tool F is guided over the surface of the stone in the manner previously described. As the treating operation proceeds, chips of stone and stone dust are freed from the stone and are drawn into nozzle 12. The chip and dust laden air passes through conduit 10 to container 1, where the chips are separated out, and the dust laden air is exhausted through hood 71 to the fan. If it is desired to lower the nozzle assembly as the work progresses, wheel 18 is rotated to lower shaft 15. The operator preferably grasps handle 55 with his right hand, and shaft 15 with his left hand, so that he may effect vertical and horizontally swinging movements of the tool with his right hand and may use his left hand to produce bodily movements of the entire assembly, or to rotate hand wheel 18 or operate valve 51. If desired, means may be provided for adjusting crane members 25 vertically on shaft 28, but I find that the adjustment provided by hand wheel 18 is sufficient to take care of conditions usually met with in practice.

It should be observed that, although links 48 absorb substantially all vibrations that are set up by the operation of tool F, spring 19 supports the entire tool and nozzle assembly and accordingly functions to dampen out any minute vibrations that may be transmitted to shaft 15.

Referring now to Figures 15, 16, and 17, I have illustrated a modified form of surfacing machine and the major differences thereof over those previously described resides in variations in the structural features of the various parts. With continued reference to these figures, a standard or support 87, which is channel-shaped, is welded to top 4 of container 1. A pair of preferably triangular plates 88 are secured to the sides of support 87 and to top 4, for the purpose of reenforcing the support against movement under the load of the apparatus carried thereby.

A pair of bracket members 89, having bearing portions 91, are welded or otherwise attached to support 87 in vertically spaced relationship, and pivot pins 92 are journalled therein. A vertically disposed crane supporting member 93, which is also channel-shaped, is provided with a pair of bracket members 94, which are welded to the sides thereof (Figure 17), and have bearings 95, in which pins 92 are secured. Member 93 is accordingly mounted for horizontally swinging movement through an angle of 180° upon support 87.

Crane or boom members 25 are secured to member 93 as, for instance by means of an angle piece 96, which is preferably welded thereto, and brace rod 30 is secured to a yoke member 97, which is secured to the upper part of member 93. Cord 40 is secured to an upwardly extending portion 98 of carriage member 23a by means of a clip 99 or the like.

Cord 40 is led rearwardly and upwardly over pulley assembly 41, which, in this form of the invention is secured to the upper sides of members 25. Cord 40 then passes over a pulley 101 mounted on a shaft 102, which is journalled in apertures located in members 93 and 97. Member 93 is provided with a slot 103 through which pulley 101 extends. Cord 40 then passes under a pulley 104, journalled in weight 43a, and is secured to member 93, as at 105. Weight 43a is accordingly adapted to undergo vertical movement in the space defined by channel member 93, the lower position thereof being indicated by the dotted lines in Figure 15.

In this form of my invention, chain supporting rod 34a is provided with an elongated hub portion 106, and a web member 107 for reenforcing rod 34a against twisting under the load of hose 10, and it is journalled upon a pin 108 which is secured to member 93 by means of a pair of brackets 109. With reference to the carriage structure, the lower ends of carriage members 20 and 21 are welded between a pair of triangular plates 111, which are also preferably welded to sleeve member 17. In these figures, I have also illustrated a modified form of suction nozzle 12a, which has a closed bottom, as distinguished from the open bottom nozzle previously described, and which is only open at the end adjacent the tool.

The entire mechanism is accordingly supported upon a single swinging member, 93, and although the axis of oscillation thereof may be slightly offset with respect to the vertical axis of elbow 9, this does not interfere with proper operation of the device as hose 10 may readily flex and compensate for any differences in movement of the various parts. In view of the fact that this device operates in a manner similar to that set forth in connection with the first forms of my invention, it will not be described.

Although I have illustrated and described a specific form of mechanism for enabling the dust collecting nozzle and the tool at one treating to undergo substantially synchronous movement in a horizontal plane over the surface of the work that is handled by the apparatus, it is to be understood that any other suitable form of mechanism may be employed for obtaining this result without departing from the spirit of my invention. Moreover, while I have shown member E as being mounted for movement toward and away from support B by means of a carriage D, it is to be understood that two or more pivotally interconnected link members, operable to swing in a horizontal plane, may be employed for achieving this end, and the appended claims are intended to embrace my apparatus when it is constructed in this manner.

I have illustrated a parallelogram link mechanism for supporting the tool in my apparatus, and I prefer to use this structure for the reason that it enables the tool to undergo reciprocating movement without setting up vibrations in the apparatus, but it is to be understood that the tool may, as a matter of fact, be associated with any other type of guiding mechanism without sacrificing the advantage that is afforded by supporting the nozzle and the tool support for synchronous movement over the face of the work. Moreover, I have illustrated the nozzle and tool holding assembly as being supported by carriage E, but it is to be understood that the nozzle and tool holder may be provided with individual supporting means for movement over the surface of the work, and, if desired, be interconnected by means of a linkage or like mechanism for substantially synchronous movement without departing from the spirit of my invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a surfacing apparatus, a substantially horizontally extending crane structure mounted for swinging movement about a vertical axis, a tool support and a dust-collecting nozzle mounted on the free end of said crane structure, a flexible dust-conveying conduit connected to said nozzle and extending toward the axis of said crane structure, and a second crane structure disposed below and adapted to swing about substantially the axis of said first crane structure, and suspension means connected to said second crane structure and to substantially the midportion of said conduit.

2. The apparatus described in claim 1, wherein said crane structures are capable of undergoing independent swinging movement about the same vertical axis.

3. In a surfacing apparatus, a substantially horizontally extending crane structure supported for swinging movement about a vertical axis, a tool holding carriage supported upon said crane structure for movement toward and away from the axis of the latter, a dust-collecting nozzle mounted on said carriage and adapted to cooperate with a tool, a flexible dust-conveying conduit extending substantially horizontally beneath said crane structure from a point adjacent the axis of said crane structure to said nozzle, and means for preventing the intermediate portion of said conduit from sagging under the influence of gravity.

4. The apparatus described in claim 3, wherein said conduit is journalled for rocking movement about a vertical axis in said nozzle, whereby said conduit may flex without interference therefrom when said carriage undergoes movement toward and away from said axis.

5. The apparatus described in claim 3, wherein both ends of said conduit are journalled for rocking movement about vertical axes, whereby the intermediate portion thereof may freely flex when said carriage undergoes movement toward and away from the axis of said crane structure.

6. In a surfacing apparatus, a dust-collecting nozzle adapted to be used in connection with a surfacing tool, means mounting said nozzle for swinging movement about a substantially vertical axis and for movement toward and away from said axis, a flexible dust-conveying conduit connected to said nozzle and extending substantially horizontally toward said axis, said conduit being adapted to assume a bowed configuration when said nozzle is moved toward said axis, but normally manifesting a tendency to straighten out, and means for urging said nozzle toward said axis to at least partially overcome the straightening tendencies of said conduit.

7. The apparatus described in claim 6, wherein said last-named means is operable to exert a force of substantially constant magnitude upon said nozzle.

8. The apparatus described in claim 6, together with means for compelling said conduit to bow in a horizontal plane when said nozzle is moved toward said axis.

9. In a surfacing apparatus, a carriage supported for guided horizontal movement, an arm extending downwardly from said carriage and having a support mounted for vertical movement thereupon, a tool holder mounted for vertical movement upon said support, and a dust-collecting nozzle connected to said support and adapted to carry away dust developed by said tool.

10. The apparatus described in claim 9, wherein said tool holder is connected to said support by means of a pair of horizontal link members.

11. The apparatus described in claim 9, wherein said support comprises a vertically disposed rod, and said tool holder is operable to rock in a horizontal plane about said rod.

12. The apparatus described in claim 9, wherein said support is connected to said arm by resilient means, whereby vibrations set up in said support will not be communicated to said arm and said carriage.

13. In a surfacing apparatus, an upstanding container having a chip-separating mechanism located therein and having an apertured top wall, a dust conduit extending through said wall and journalled for movement about a substantially vertical axis, an upright support provided on said container and extending above said conduit, and a crane structure connected to said conduit and mounted on said support for swinging movement about substantially the same axis as said conduit.

14. The apparatus described in claim 13, wherein said crane structure is operable to swing about said vertical axis.

15. The apparatus described in claim 13, together with a second crane structure mounted for swinging movement substantially about said second-named axis and connected to the intermediate portion of said conduit.

WM. A. ROSENBERGER.